Nov. 30, 1937.　　　　J. J. SINDLER　　　　2,100,492
PNEUMATIC SHEET MATERIAL AND METHOD OF MAKING
Filed Oct. 23, 1933
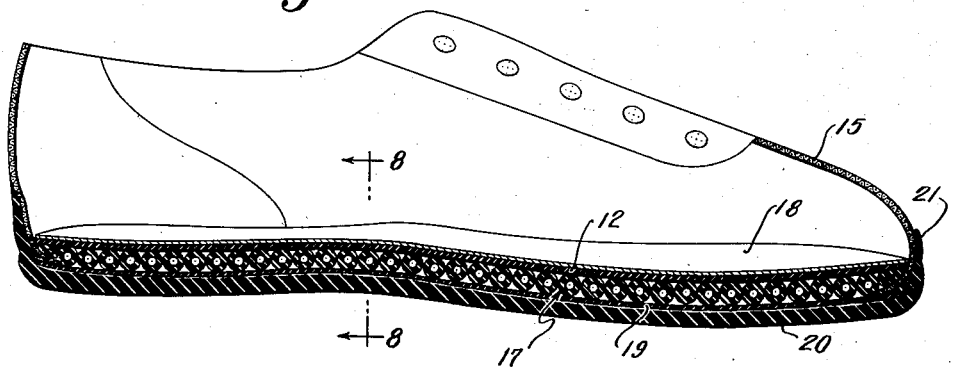
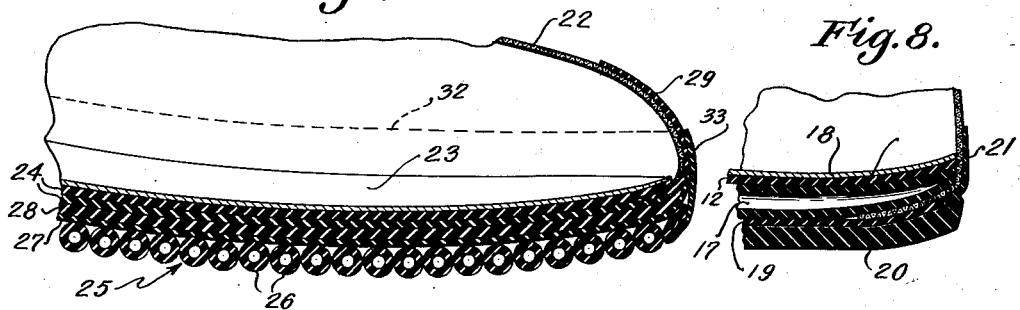
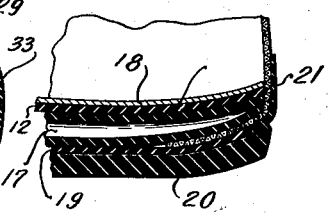
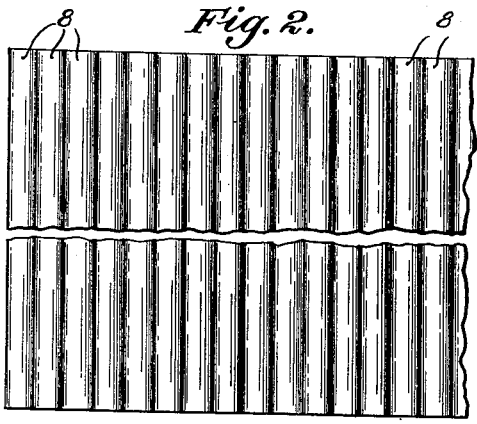
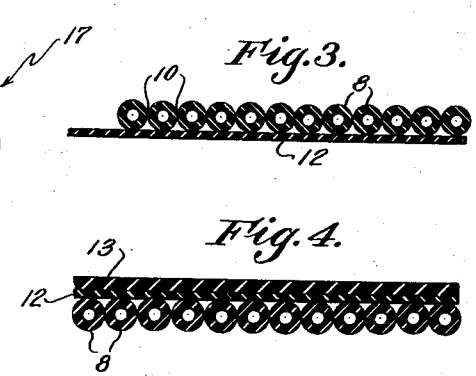
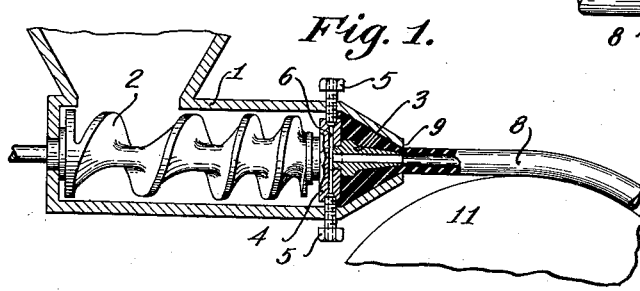
Inventor,
Jay J. Sindler,
by Roberts, Cushman & Woodberg
Attys.

Patented Nov. 30, 1937

2,100,492

UNITED STATES PATENT OFFICE 2,100,492

PNEUMATIC SHEET MATERIAL AND METHOD OF MAKING

Jay J. Sindler, Malden, Mass., assignor to Converse Rubber Company, Malden, Mass., a corporation of Massachusetts Application October 23, 1933, Serial No. 694,732

5 Claims. (Cl. 154—2)

This invention relates to a pneumatic sheet material which is of general utility, but which finds especial application in the construction of shoes, and to a method of making the same.

The invention includes the concept of a sheet which may be made of substantially any thickness that may be desired. It is composed of a plurality of hollow cylindrical tubes made of resilient material, preferably rubber, and laid together longitudinally and joined into an integral sheet, by direct welding of the adjacent surfaces of the tubing. The resulting sheet is characterized by flexibility, both longitudinally and transversely, and also by a compressive pneumatic resiliency, resulting from the hollow tubular structure. This property may be emphasized by compressing and closing the ends of the tubes, so that the air cells are completely enclosed and thus acquire an increased resistance to high compression pressures and a capacity for distributing local applications of pressure lengthwise of the tube cavities.

The structure of the integrated sheet may be regulated by the size, shape, composition and relative proportions of the individual tubes of which it is composed. Ordinarily the several lengths of tubing will be of the same size and other characteristics generally, if not identical with each other, but variations may be made therein and in their assembly in the sheet, according to practices and devices known to the art of rubber manufacture. The product or products obtained will vary accordingly and will be adaptable to various uses.

The method of the invention generally includes the preparation of a suitably plastic charge of material which may subsequently be solidified to a resilient body, such as a vulcanizable rubber mixture which may be made into hollow tubing in various ways, but preferably by extruding from a die, in the form of a continuous strip. The tubing may or may not be cut into lengths but is laid in a series of parallel, juxtaposed rows. For example, this may be done by cutting the continuous tubing off in desired lengths and assembling them in such rows. It may also be effected by collecting the continuous strip on a cylindrical mandrel, in the form of a helical spiral. The tubing may also be coiled in a flat spiral, or back and forth, with sharp bends at each end, in parallel arrangement. The lengths of unvulcanized tubing as thus formed and laid together in strips may next be assembled in contact with each other longitudinally and integrated in various ways. Thus, they may be welded together by slight pressure when of plastic consistency, without a solvent, or may be joined by a rubber solvent. The integrated sheet as thus formed is continuous and may be used in this condition or may be provided with a backing, as by laying a sheet of soft, unvulcanized rubber upon the aggregated layer of tubing and compressing the two into intimate contact. A backing sheet may be applied to both sides of the sheet of tubing, if desired. Rubber solvent may also be applied in this operation to join the tubing together and to the backing.

As thus assembled, the integrated layer or sheet of tubing or tubing and backing may be subjected to vulcanization, whereupon the whole becomes more firmly integrated into a sheet which is characteristically resilient and pliable and as such may be incorporated in many constructions. If the construction is such that the whole may be later subjected to vulcanization, the unvulcanized sheet may be incorporated in such construction and subsequently vulcanized in the assembled product.

While the product as thus prepared is applicable for many purposes, a typical adaptation of the same is in the form of a sheet suitable to be incorporated in the construction of the soles for footwear of various types. A representative example of the application and of one mode of carrying out the invention will therefore be described in respect of a sheet material suitable for incorporation in shoes, reference being had to the accompanying drawing in which:

Fig. 1 is a diagrammatic view of the extrusion apparatus and mandrel;

Fig. 2 is a plan view of the assembled tubings, joined together longitudinally;

Fig. 3 is a cross-section of the same with a single backing;

Fig. 4 is a cross-section of the same with a double backing;

Fig. 5 is a cross-section of a single tubing showing a closed end;

Fig. 6 is a longitudinal cross-section of a shoe in which the sheet material is incorporated as an inner sole;

Fig. 7 is a longitudinal cross-section of a shoe (with parts broken away) in which the sheet is incorporated as the outer sole; and Fig. 8 is a partial cross-section in the plane 8—8 of Fig. 6.

While the rubber compositions which are or may be rendered suitably plastic for the present invention are numerous and may be varied according to the well-known principles of the rubber mixing and manufacturing art, a simple and satisfactory black composition may be prepared as follows:

|  | Parts |
|---|---|
| Rubber | 60.000 |
| Carbon black | 25.000 |
| Palm oil | 2.000 |
| Zinc oxide | 5.000 |
| Sulphur | 1.125 |
| Stearic acid | 1.000 |
| Captax accelerator | 1.000 |
| Whiting | 4.875 |
|  | 100.000 |

This composition, when thoroughly mixed, is soft and plastic and readily acquires a uniform, tacky consistency. It is worked thoroughly, to exclude air bubbles if present, and placed in the chamber of the extrusion machine 1. The spiral blades 2 are driven by any suitable source of power (not shown) and urge the mass forward into the conical shaped end 2 of the chamber, where it is confined and forced around a die 3. This die is supported in the center of the conical end by a spider or framework 4, which is preferably of thin cross-section, especially in the direction of flow of the plastic mass, and may be adjusted and held firmly in position by set screws 5. One or more of the framework members may be made hollow, as indicated at 6, to provide for the entrance of air, which is sometimes utilized to introduce fine dust, such as talc, into the inside of the tube, when it is desired to prevent the walls from adhering together.

The plastic composition, which heals together after passing the framework 4 into a continuous, uniform plastic mass, is extruded in the form of a continuous hollow tubing 8. The size and shape of the tubing is governed by the size and shape of the die 3 and of the nozzle 9—and the wall thickness and shape by the width of the annular aperture provided between them at the exit end.

The continuous tubing, as it comes from the extrusion machine, may be cut off in lengths and the lengths assembled. It may also be laid in folded parallel lengths, as above indicated. As shown, however, it may conveniently be gathered on a large cylindrical drum or mandrel 11 in a gradual spiral, the coils being laid directly in close contact with each other, or slightly spaced apart and urged together by the operator or suitable cross-feeding device (not shown).

When the surface of the mandrel is thus covered with a layer of tubing, another mandrel may be mounted in its place, and the extrusion machine thus operated continuously, fresh charges of the rubber composition being added to the mixing chamber from time to time.

The cylindrical sheet of tubing as thus obtained may be further integrated simply by pressure, as by rolling it against a compression roll, without permitting the tubing to slip longitudinally of the roll. This will tend to increase the length of the tubing and hence the diameter of the rolled sheet. This has no serious effect but may serve to loosen the sheet from the mandrel. The sheet may then be cut longitudinally and stripped from the roll or may be slipped off the roll endwise, without cutting, if a cylindrical sheet is desired. To facilitate such removal, the surface of the roller or mandrel may be coated with an inert powder, soap or other lubricant.

As thus formed, the sheet has the appearance illustrated in Fig. 2. The successive lengths of tubing are uniformly and firmly joined lengthwise,—either in a thin line or through an area of appreciable width, depending largely upon the pressure with which they are compressed on the roller to aggregate them into an integral sheet. Owing to the softness of the sheet in this condition, if it is cut transversely of the tubings, the pressure tends to close the hollow tubing and, the inner surfaces of the walls being tacky, they tend to cohere and thus form complete closures of the hollow tubes, as shown in Fig. 5. This may be prevented by blowing dust into the tube through the opening 6, as suggested above.

For some purposes, the integrated sheet as thus obtained may be regarded as a finished product, or to be completed by merely cutting to required shapes and sizes and then vulcanizing. Or the sheet, as thus made, may be combined with other materials and then vulcanized in association therewith.

In either mode of procedure, the successive lengths of tubing may be so chosen and assembled that they form a sheet of the desired size and shape. The several lengths of tubing may also be made of varying diameters, and successive lengths may then be so chosen and assembled as to provide the desired variations in thickness of the resulting sheet.

For other purposes, it will be desirable to combine the sheet with a continuous backing sheet. In this event, the backing sheet is conveniently one of rubber or rubber coated fabric. It may, for example be of the same composition as the tubing and, likewise, unvulcanized. It may, however, be of an altogether different rubber composition, or may be of fabric, paper, etc., or the like.

If the backing sheet is of unvulcanized rubber, it may be applied to the tubing sheet, while on the mandrel, and firmly associated and integrated therewith by rubbing only or by compression.

The backing may be a single sheet or may be already composed of two or more layers of rubber, such as the layers 12, 13, in Fig. 4, in which, for example, a layer of crepe rubber 13 is associated with a layer of rubber 12 which is of the same composition as the tubing.

The sheet of tubing, alone or associated with the backing sheet 12 (or sheets 12 and 13), may now be further integrated by subjecting to vulcanization in the customary manner, the properties of the resulting product depending upon the composition of the rubber used and the time and temperature of the vulcanization treatment.

Accordingly, the product may be given any of the various properties characteristic of vulcanized rubber and will typically be resilient, tough, strong and elastic, and present a firm friction resisting surface. In addition, it will have the pneumatic resiliency and a factor of yieldability imparted to it by the tubular structure and the double arched effect of the rounded tubing. At the same time, each tube, owing to its fixed juxtaposition to the next (especially when the tubing sheet is attached to a backing sheet) will resist extension and flattening of the tubes. This effect will be still further enhanced lengthwise of the tubes if the ends are closed and sealed, as above mentioned, so as to retain the enclosed air therein under pressure.

An integrated sheet thus produced may now be cut into various shapes to serve many purposes. Its use as an inner sole in footwear (rubber footwear in particular) will be described as a typical example. A canvas or duck upper 15 (Fig. 6) is first shaped and lasted to an inner sole 18 in the usual manner. The upper 15 and the outer portion of the inner sole are cemented so that the foxing 21 may be placed around the lower portion of the upper, thus serving the purpose of providing a bearing surface for subsequently securing the outer sole to the upper.

The integrated tubular sheet 17 may be a part of or may comprise the inner sole 18, or it may be placed on separately as a filler, so-called. Alternatively, it may be used in combination with or without any of the commonly used fillers,—viz.; rubber, rubber-coated fabric, fibrous materials, paper, etc. As shown in Fig. 6, it supplements the separate inner sole 18 and receives the margin of the upper 15. The backing 12 lies smoothly and firmly against the inner sole 18 and is cemented, as well as the underside of the inner sole or any combination thereof. A foxing, toe cap, etc., if used, may be applied at this stage. A filler piece 19 is then set in place and the outer sole 20 is attached to the assembly. A strip of foxing 21 is then applied and, with sufficient rolling and pressing, to effect firm contact and integration between the parts, the shoe, as shown in Fig. 6, is ready for vulcanizing.

Another arrangement of the pneumatic sheet in a rubber shoe structure is illustrated in Fig. 7. The usual procedures for the construction of rubber shoes may be followed to the point where the outer sole is applied. It may, for example, comprise an upper 22 and inner sole 23 and two filler strips 24. As an outer sole, the integrated tubular sheet 25 may be used, either in the unvulcanized condition, or in the vulcanized, or partially vulcanized state. The tubular outer sole may or may not be backed, but in the instant case the tubes 26 are provided with a backing sheet 27 and crepe sheet 28. The ends of the tubes comprising the outer sole may be sealed, either by compressing before vulcanizing, or by means of a foxing or strips of rubber coated fabric 29, placed around the periphery of the outer sole. To construct this type of shoe, the upper 22 is lasted to one of the many ordinarily used inner soles 23, which may be waste fiber, coated fabrics, etc. A portion of the upper, to the line 32, and the exposed side of the inner sole are cemented and allowed to dry. A foxing 33 is attached all around the lower portion of the upper, as shown by line 32, and extends for a short distance around the inner sole. Fillers 24 may or may not be attached. If so, they are well cemented to outer sole to insure permanency. Then the tubular sheet or outer sole 25, preferably backed by sheets of rubber, as shown, is added to the assembly, adhering firmly to the foxing all around the shoe, and to the bottom (which has been well cemented) by rolling and pressing methods, in common practice in shoe construction.

A third type of construction is possible in that the shoe may have both inner sole and outer sole made of the integrated tubular sheet (not shown). Other combinations will be readily evident to those skilled in the art.

In a shoe of such construction, the sole is yieldable to pressure of the foot throughout its area, but without tending to deform permanently and without decreased wear resistance. It is easily made, light in weight, and in some types of shoe may effectively replace the filler materials commonly employed between the outsole and the insole. As shown, the tubular sheet extends throughout the area of the sole, but it may be confined to the heel and ball portions where the greatest pressure of the foot normally comes and shocks and fatigue effects are emphasized. To this end, the described sheet presents a pneumatic cushioning effect, whether the ends of the tubing are closed or not, and the necessity of wearing a rubber heel or a rubber outer sole is removed. Accordingly, those who prefer shoes with leather soles and heels may be provided with this type of shoe, and yet retain the resilient cushioning for which rubber heels and soles are primarily worn.

It is to be understood that the size, shape, wall thickness and arrangement of the hollow tubing employed may be varied and selected at will to modify the degree of thickness, resiliency, and cushioning action upon the foot. Different sizes, etc. of tubing may, for example, be integrated into the sheet used in a given shoe, to vary these relative properties and although not shown will be obvious from the drawing.

In the second type of assembly, above described and shown in Fig. 7, the tubing layer is exposed and forms the bottom of the shoe, giving the tread surface a corrugated formation which has an especially effective grip upon the ground. It is also freely flexible with flexions of the foot, the successive strips of tubing tending to open out accordingly. Even when the tubing walls are worn through, the remaining upper portions are still attached to the sole and form arched ribs, the lower edges of which present a gripping tread to the ground and the upper portions cushioning the foot as before, though not so effectively of course as when the tubing sections are new and hermetically enclose the air in the air cells.

Other uses for the pneumatic sheet material provided by this invention will occur to those skilled in the arts, when such properties are required. For example, it may be employed as belting, when it is especially suitable to flex over pulleys without stretching or slipping, as carpeting underlay, stair treads, lining, packing, upholstering, sound, heat, or electrical insulation, etc. In such applications, more than one layer of tubing may be formed and integrated. It is to be understood that various modifications and adaptations of the invention may be made, both in the composition and arrangement of the product, as well as in the steps of the process of manufacture, but that such modifications and adaptations are to be regarded as comprehended by the present disclosure and included in the terms of the following claims.

I claim:

1. A shoe having an outer sole, comprising a plurality of lengths of hollow rubber tubing disposed in longitudinal continuous direct contact with each other and integrated throughout the lines of contact therebetween.

2. A shoe having an inner sole, comprising a plurality of lengths of hollow rubber tubing disposed in longitudinal continuous direct contact with each other and integrated throughout the lines of contact therebetween.

3. A shoe having an inner sole, comprising a plurality of lengths of hollow rubber tubing disposed in longitudinal continuous direct contact with each other, and integrated throughout the lines of contact with each other and with the shoe.

4. Process of making flexible sheet material, comprising the steps of assembling a plurality of lengths of hollow, plastic, unvulcanized rubber tubing, longitudinally in continuous direct contact with each other, immediately after forming the same and while the surfaces are in tacky condition, to form a layer thereof, applying a backing sheet to said layer and integrating the same together and to said backing by light compression.

5. Process of making flexible sheet material, comprising the steps of assembling a plurality of lengths of hollow, unvulcanized rubber tubing, longitudinally in continuous direct contact with each other, immediately after forming the same and while the outer surfaces are in tacky condition, to form a layer thereof, applying a backing sheet to said layer of tubes and integrating the same to each other and to said backing by vulcanization.

JAY J. SINDLER.